United States Patent
Gatley et al.

(10) Patent No.: US 7,204,517 B2
(45) Date of Patent: Apr. 17, 2007

(54) MOTOR VEHICLE STEERING COLUMN ARRANGEMENT

(75) Inventors: Phil Gatley, Rugby (GB); Jon Deighton, Chapelfields (GB)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 10/976,055

(22) Filed: Oct. 28, 2004

(65) Prior Publication Data

US 2005/0116458 A1    Jun. 2, 2005

(30) Foreign Application Priority Data

Oct. 28, 2003   (GB) ................................ 0325070.1

(51) Int. Cl.
*B62D 1/16*    (2006.01)

(52) U.S. Cl. ......................................... 280/779; 74/492

(58) Field of Classification Search ................ 280/779, 280/775; 74/492, 493, 495
See application file for complete search history.

(56) References Cited

U.S. PATENT DOCUMENTS

| | | | | |
|---|---|---|---|---|
| 133,766 | A | * 12/1872 | Easterly | ................... 248/188.2 |
| 3,030,730 | A | * 4/1962 | Costar | ..................... 248/188.2 |
| 3,543,538 | A | * 12/1970 | Skelley et al. | ................ 464/93 |
| 3,588,203 | A | * 6/1971 | Purman | ....................... 384/126 |
| 3,798,701 | A | * 3/1974 | Irwin et al. | ................ 15/235.8 |
| 4,614,444 | A | 9/1986 | Hines | |
| 4,798,359 | A | * 1/1989 | Ball | ........................ 248/188.3 |
| 4,943,182 | A | * 7/1990 | Hoblingre | ................... 403/349 |
| 5,024,118 | A | * 6/1991 | Khalifa et al. | ................ 74/492 |
| 5,673,938 | A | * 10/1997 | Kaliszewski | ................ 280/777 |
| 5,964,536 | A | * 10/1999 | Kinoshita | ................... 384/441 |
| 2003/0231927 | A1 | * 12/2003 | Hale | .......................... 403/349 |

* cited by examiner

*Primary Examiner*—David R. Dunn
*Assistant Examiner*—Joseph Rocca
(74) *Attorney, Agent, or Firm*—Fredrick Owens

(57) ABSTRACT

A bulkhead collar for using in conjunction with a bearing housing of a motor vehicle steering column including an upper column shaft and a lower column shaft where the lower column shaft passes through an opening in a bulkhead in the vehicle. The bearing housing is free to rotate on the lower steering column shaft and has a flange for fixing the bearing housing to the collar. The flange comprises two radially extending lugs having holes for alignment with complementary holes on the collar. The collar has a two-way ramp which can abut the edges of the lug so that axial movement of the bearing housing relative to the lower column shaft during installation of the steering column in the vehicle can rotate the bearing housing to automatically align the holes.

16 Claims, 3 Drawing Sheets

MOTOR VEHICLE STEERING COLUMN ARRANGEMENT

FIELD OF THE INVENTION

The present invention relates to a motor vehicle steering column arrangement and particularly to a bulkhead collar for use in conjunction with a bearing housing of steering column where the column passes through an opening in a bulkhead of the vehicle.

TECHNICAL BACKGROUND

At the time of the assembly of motor vehicles on a production line, the steering column must be introduced from the passenger compartment through an opening in the bulkhead separating the passenger compartment from the engine compartment.

In one known type of steering column, the bearing housing has to be fixed to a bulkhead collar by means of a flange on the bearing housing which is connected to the collar by threaded fasteners. This requires the bearing housing and the collar to be at a set angular relationship in order to engage the threaded fasteners and it is usually necessary for an operator to reach into the footwell of the passenger compartment to align the bearing housing and tighten the fasteners. This operation requires a certain skill and flexibility of the operator and can have real ergonomic issues for the operator.

It is an object of this invention to provide an improved arrangement of bulkhead collar for a motor vehicle steering column.

SUMMARY OF THE INVENTION

According to a first aspect of the invention there is provided a steering column arrangement for a motor vehicle having an opening in a bulkhead wherein a portion of the steering column arrangement passes through the opening in the bulkhead. The steering column arrangement comprises a bearing housing attached to a steering column shaft, the bearing housing comprising a flange having at least one radially extending lug and the flange having a bearing housing fastener feature. The steering column arrangement also comprises a bulkhead collar for attachment to the bulkhead, the bulkhead collar further having a bulkhead collar fastener feature and a self-aligning means for arranging the bearing housing fastener feature in line with the bulkhead collar fastener feature. The bulkhead collar self-aligning means lines up the bearing housing fastener feature with the bulkhead collar fastener feature when axial movement of the bearing housing relative to the steering column shaft occurs during installation of the steering column arrangement in the vehicle.

The invention also provides, according to a second aspect thereof, a bulkhead collar for passing a steering column arrangement through a motor vehicle bulkhead comprising a collar having an inner flange extending radially from the collar portion, the inner flange having at least one fastener feature and a two-way helical ramp, and an outer flange connected to the inner flange for attachment to the bulkhead.

The invention further provides, according to a third aspect thereof, a method of assembling a steering column arrangement for a motor vehicle having an opening in a bulkhead. The steering column arrangement comprises a bulkhead collar having a self-aligning means, a bearing housing, and a steering column shaft wherein a portion of the steering column arrangement passes through the opening in the bulkhead. The method comprising the steps of: threading the steering column arrangement from a passenger compartment through the bulkhead into an engine compartment such that the bulkhead collar is in contact with the bulkhead; moving the bearing housing into contact with the bulkhead collar self-aligning means; and moving the bearing housing in an axial direction relative to the steering column shaft so that it is rotated by the bulkhead collar self-alignment means for attachment between the bulkhead fastener features and the bearing housing fastener features.

BRIEF DESCRIPTION OF THE DRAWINGS

The invention will now be described by way of example with reference to the accompanying drawings, of which.

DETAILED DESCRIPTION OF THE PREFERRED EMBODIMENTS

Figure 1:
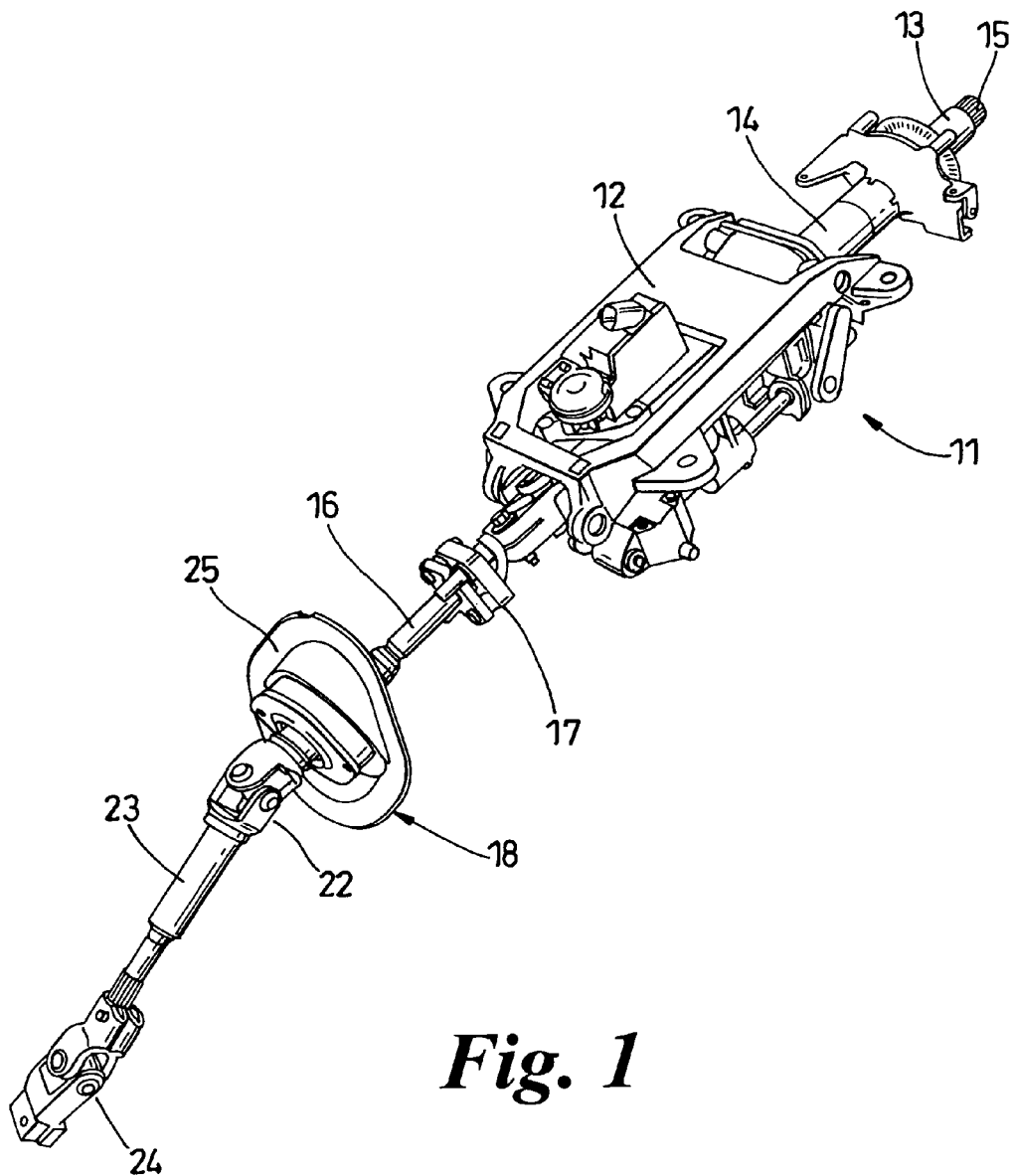
FIG. 1 is a perspective view of a motor vehicle steering column arrangement incorporating a bulkhead collar according to the invention.
Figure 2:
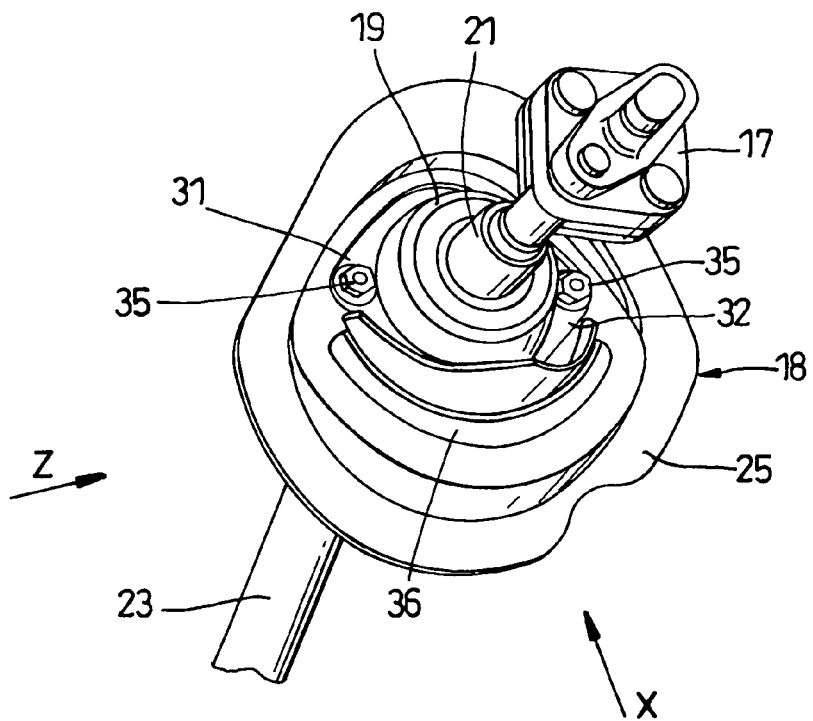
FIG. 2 is a perspective view to part of the lower column steering of FIG. 1.

FIGS. 1 to 7 show a motor vehicle steering column arrangement in which a steering column assembly 11 includes a fixed mounting 12 by which the steering column assembly is mounted to a front cross-member of the vehicle passenger compartment. An upper column shaft 13 is rotatable in a housing 14 carried on the fixed mounting 12 and has a splined end 15 to receive a steering wheel (not shown). The housing 14 and upper column shaft 13 are provided with adjustment mechanisms to give rake and reach adjustment for the steering wheel. A lower column shaft 16 is axially aligned with the upper column shaft 13 and coupled to it by a flexible coupling 17. A bulkhead collar 18 is attached to a bulkhead separating an engine compartment from the passenger compartment and carries a bearing housing 19 having a bearing 21 which supports the lower shaft 16 near its lower end where it is connected by a universal joint 22 to a telescopic coupling shaft 23. Another universal joint 24 is provided to couple the coupling shaft 23 to a steering rack assembly (not shown).

Figure 5:
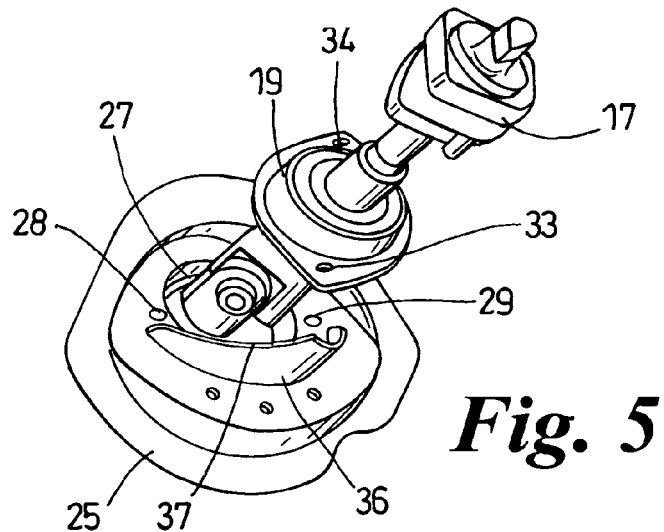
FIGS. 5 to 7 are perspective views similar to FIG. 2 illustrating the different stages of the assembly of the steering column to the vehicle.

The bulkhead collar 18 has an outer flange 25 by which it is attached to the bulkhead and an inner flange 26 having a lipped central opening 27 and fastener features in the form of two holes 28, 29 (FIG. 5).

It will be appreciated that the collar 18 can be assembled on the bulkhead and fixed on it, e.g. by means of sets of screws and nuts, in order to overcome issues of removing the column in service. The collar may also be welded or integral with the bulkhead.

The bearing housing 19 has a flange for fixing the bearing housing 19 to the collar 18. The flange comprises two radially extending and symmetrically arranged lugs 31, 32, each being substantially V-shaped with rounded ends. Each of these lugs 31, 32, has a fastener feature in the form of a hole 33, 34 which cooperates with the respective hole 28, 29 in the collar to permit the insertion of a fastening screw in order to fasten the bearing housing 19 to the collar 18. Each lug 31, 32 has a captive nut 35 fastened on its upper face, i.e. the passenger compartment side, so that the nut 35 is axially aligned with the corresponding hole 28 or 29.

Figure 3:
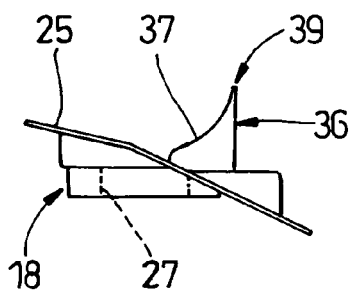
FIG. 3 is a side view of a bulkhead collar shown in FIG. 2 as seen in the direction of the arrow Z.
Figure 4:
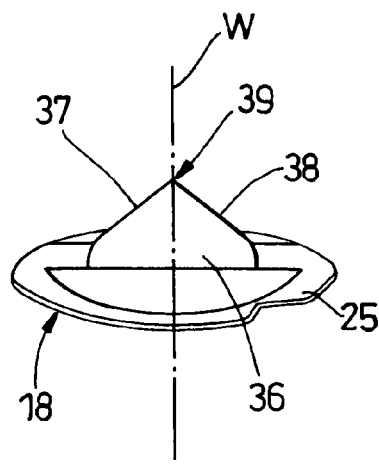
FIG. 4 is a side view of a bulkhead collar shown in FIG. 2 as seen in the direction of the arrow X.

The collar 18 includes a self-alignment means to align the holes 33, 34 on the bearing housing 19 with its own holes 28, 29. This self-alignment means comprises an arcuate wall 36 extending perpendicularly relative to the collar 18 in the direction of the passenger compartment. This wall 36 is positioned between the pair of holes 28, 29 on the collar 18, i.e. at the periphery of the central opening 27 of the collar 18. The upper edge of this wall 36 forms two slopes or ramps 37, 38, each inclined towards the inner flange 26. There is an axis of symmetry W where the slopes meet at a peak 39. Thus the slopes 37, 38 form a two way helical ramp, as shown in FIGS. 3 and 4.

It will be noted that in the assembled position (shown in FIG. 2) of the bearing housing 19 on the collar 18, the two lugs 31, 32 of the bearing housing 19 are by, one of their edges, in contact with the base of the wall 36.

Figure 6:
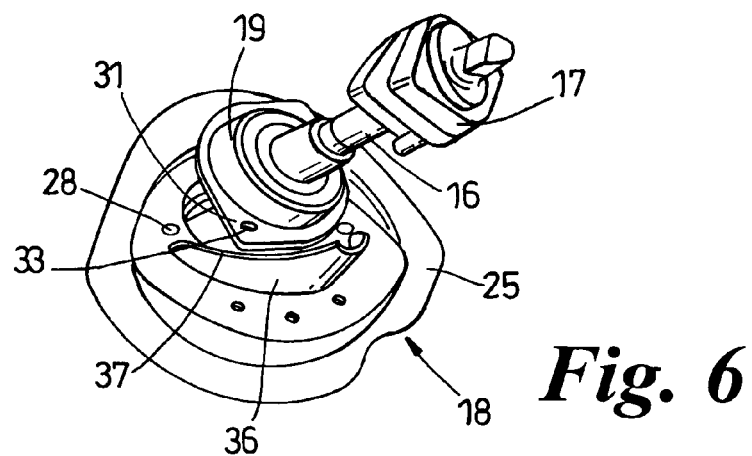
Figure 7:
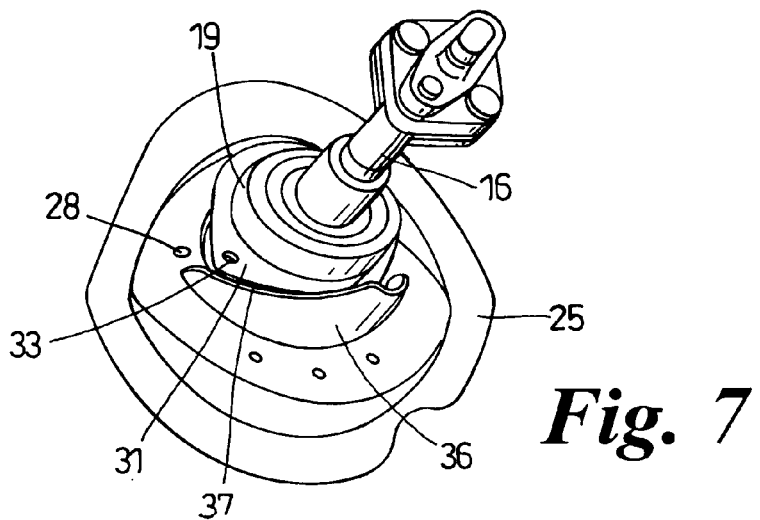

Referring now to FIGS. 5 to 7, there will be described the different stages of the assembly of the steering column assembly 11 into the motor vehicle.

The collar 18 is first assembled in the opening of the bulkhead, then the steering column assembly 11 with the bearing housing 19 freely rotatable on the lower column shaft 16 is threaded from the passenger compartment toward the engine compartment through the central opening 27 of the collar 18 as shown in FIG. 5. Unless the holes 33, 34 in the bearing housing 19 are already aligned with the holes 28, 29 in the collar 18, one of the flange lugs 31, 32 will then contact one of the slopes 37, 38 of the wall 36 (FIG. 6). Further axial movement of the column assembly 11 is then translated into rotational movement of the bearing housing 19 as one or other of the lugs 31, 32 runs down the slope or ramp 37 or 38 (FIG. 7) until the bearing housing 19 abuts the inner flange 26 of the collar 18. Over-rotation is prevented by the opposite lug coming into contact with the other ramp 37 or 38. At the base of the ramps the longitudinal axes of the holes 33, 34 of the bearing housing 19 are then automatically in axial alignment with the longitudinal axes of the holes 28, 29 on the collar 18. An operator standing in the engine compartment can then thread the screws into the captive nuts 35 on the bearing housing 19 through the bulkhead from the engine compartment side to secure the bearing housing 19. Thus, the installation of the steering column through the bulkhead is simplified and does not need the operator to bend or lie in the footwell of the passenger compartment.

Although the fastener features on the bearing housing 19 and the collar 18 as described herein are holes it will be appreciated that this need not be the case and they could be holes and studs.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

We claim:

1. A steering column arrangement for a motor vehicle having an opening in a bulkhead wherein a portion of the steering column arrangement passes through the opening in the bulkhead, the steering column arrangement comprising:

a bearing housing attached to a steering column shaft, the bearing housing comprising a flange having at least one radially extending lug, the flange having a bearing housing fastener feature; and a bulkhead collar for attachment to the bulkhead, the bulkhead collar having a bulkhead collar fastener feature and a self-aligning means for arranging the bearing housing fastener feature in line with the bulkhead collar fastener feature, wherein the bulkhead collar self-aligning means lines up the bearing housing fastener feature with the bulkhead collar fastener feature when axial movement of the bearing housing relative to the steering column shaft occurs during installation of the steering column arrangement in the vehicle.

2. The steering column arrangement of claim 1, wherein the bearing housing is free to rotate on the steering column shaft.

3. The steering column arrangement of claim 1, wherein the flange comprises two radially extending and symmetrically arranged lugs.

4. The steering column arrangement of claim 3, wherein the self-aligning means comprises a two-way helical ramp which is arranged on the bulkhead collar to contact at least one of the lugs during installation of the steering column so that over-rotation of the bearing housing is prevented by the opposite side of the two-way helical ramp.

5. The steering column arrangement of claim 4, wherein the fastener features on the collar and the bearing housing are holes for receiving fasteners.

6. The steering column arrangement of claim 4, wherein the fastener features on the collar and the bearing housing are respectively a stud and a hole.

7. The steering column arrangement of claim 4, wherein the fastener features on the collar and the bearing housing are respectively a hole and a stud.

8. A bulkhead collar for passing a steering column arrangement through a motor vehicle bulkhead comprising:

a collar having an inner flange extending radially from the collar portion, the inner flange having at least one fastener feature and a two-way helical ramp, and an outer flange connected to the inner flange for attachment to the bulkhead.

9. The bulkhead collar of claim 8, wherein the two-way helical ramp is arranged on the bulkhead collar to contact the steering column arrangement during installation.

10. The bulkhead collar of claim 8, wherein the at least one fastener feature on the inner flange are holes for receiving fasteners.

11. The bulkhead collar of claim 8, wherein the at least one fastener feature on the inner flange is a stud.

12. A bulkhead collar for passing a steering column arrangement through a motor vehicle bulkhead, the steering column arrangement comprising a steering column shaft and a bearing housing, the bearing housing being free to rotate on the steering shaft and having a bearing housing fastener feature comprising:

a collar having an inner flange extending radially from the collar portion having a fastener feature and a two-way helical ramp, and an outer flange connected to the inner flange for attachment to a bulkhead wherein the two-way helical ramp lines up the bearing housing fastener feature with the bulkhead collar fastener feature when axial movement of the bearing housing relative to the steering column shaft occurs during installation of the steering column arrangement in the vehicle.

13. The bulkhead collar of claim 12, wherein the inner flange fastener feature is a hole.

14. The bulkhead collar of claim 12, wherein the inner flange fastener feature is a stud.

15. A method of assembling a steering column arrangement for a motor vehicle having an opening in a bulkhead, the steering column arrangement comprising a bulkhead collar having a self-aligning means, a bearing housing, and a steering column shaft, wherein a portion of the steering column arrangement passes through the opening in the bulkhead, the method comprising the following steps:

threading the steering column arrangement from a passenger compartment through the bulkhead into an engine compartment such that the bulkhead collar is in contact with the bulkhead;

moving the bearing housing into contact with the bulkhead collar self-aligning means, and moving the bearing housing in an axial direction relative to the steering column shaft so that it is rotated by the bulkhead collar self-alignment means for attachment between the bulkhead fastener features and the bearing housing fastener features.

16. The method of claim 15, wherein the self-aligning means is a two-way helical ramp.

\* \* \* \* \*